United States Patent

[11] 3,614,668

[72] Inventor Toshiaki Sudoh
Tokyo, Japan
[21] Appl. No. 11,212
[22] Filed Feb. 13, 1970
[45] Patented Oct. 19, 1971
[73] Assignee Nippon Electric Company, Limited
Tokyo, Japan

[54] DOUBLE-BALANCED MODULATORS OF THE CURRENT SWITCHING TYPE
10 Claims, 6 Drawing Figs.

[52] U.S. Cl. .......... 332/24,
307/243, 330/15, 332/21, 332/43 B
[51] Int. Cl. .......... H03c 1/54,
H03c 3/26
[50] Field of Search .......... 332/21, 24,
43 R, 43 B; 307/243; 330/15

[56] References Cited

UNITED STATES PATENTS

| | | | |
|---|---|---|---|
| 1,563,342 | 12/1925 | Conrad .......... | 332/43 X |
| 3,124,767 | 3/1964 | Pospischil .......... | 332/43 B |
| 3,239,771 | 3/1966 | Andreatta .......... | 330/15 |
| 3,239,780 | 3/1966 | Echarti .......... | 332/43 B |

*Primary Examiner*—Alfred L. Brody
*Attorney*—Ostrolenk, Faber, Gerb & Soffen

ABSTRACT: A double-balanced modulator for modulating a carrier with an input signal. A pair of balanced amplifiers each are arranged to modulate a carrier signal with an input signal during alternating half-wave periods of the carrier. The input signal is coupled to the pair of balanced amplifier-modulators by means of a constant current driver circuit which applies operating current in alternating fashion to the pair of balanced amplifier-modulators whereby only that modulator which is operating during any given half cycle receives operating current so as to produce a modulated carrier which is substantially free of unwanted harmonics and is therefore substantially distortion-free.

INVENTOR.
TOSHIAKI SUDOH
BY
Ostrolenk, Faber, Gerb & Soffen
ATTORNEYS

DOUBLE-BALANCED MODULATORS OF THE CURRENT SWITCHING TYPE

This invention relates to modulators for modulating carrier signals through the use of double-balanced modulator circuits comprised of active elements and more particularly to a double-balanced modulator apparatus for frequency-division-multiplexing systems, video converters and the like, which is capable of providing large attenuation of undesirable modulation products and which provides stable operation in spite of the occurrence of variations in the carrier level.

One technique for modulation of a carrier is that which employs conventional double-balanced modulators which, in turn, are comprised of active elements (hereinafter simply referred to as transistors). As is well known, circuits of this general type are similar in both function and operation to ring modulators in which a carrier is modulated dependent upon a polarity inversion circuit. In double-balanced modulator circuits of this type, a pair of transistors are arranged to operate as a balanced amplifier for an input signal which is modulated during one half-wave period of the carrier. Similarly, a second pair of transistors form a second balanced amplifier so as to modulate the carrier with the input signal during the other half-wave period. The pair of balanced amplifiers operate in alternating fashion during alternating half waves of the carrier cycle. The pair of balanced amplifiers are connected in parallel with each other so that the polarity of the output during one half-wave period of the carrier is opposite to the polarity of the output during the other half-wave period of the carrier. The value of the operating current of each individual balanced amplifier depends essentially upon the ratio between the voltage of the carrier and the linearizing resistors employed in the balanced amplifier circuits. Accordingly, the operating point of each amplifier is varied as a result of variations in the carrier level signal which, in turn, causes the input impedance, the conversion gain and the distortion attenuation value of the modulator to vary accordingly. This is why the grounded-base input impedance $h_{ib}$ of the transistors in the balanced amplifiers vary in proportion to an amount nearly equal to the reciprocal of the emitter current flowing through the transistors. Therefore, the operating current of the balanced amplifiers varies even when the carrier is a sine wave and has a constant DC level. Thus, due to the nonlinearity of the $h_{ib}$ characteristic, the input signal experiences distortion and some unnecessary distorted components (harmonics) such as C±2P and (±3P are produced in the output circuit. To reduce the amount of such distorted components (harmonics) present in the modulated output, it is necessary to increase the resistance values of the linearizing resistors employed in the circuit. This technique, however, results in a significant decrease in the conversion gain of the circuit. In a case where balanced modulators of the type described hereinabove are employed for wide band operation in the high-frequency region, the impedance on the output side of the balanced amplifiers cannot arbitrarily be increased. Hence, there is a limitation on the linearizing resistor values which may be employed in order to be assured that suitable conversion gain is provided. Therefore, there is a limitation in the amount to which distorted components can be suppressed, and the output of the system tends to be affected by differences in the characteristics of the transistors as well.

The present invention is characterized by providing a constant current circuit which eliminates all of the above-mentioned drawbacks which are inherent in conventional systems so as to provide a double-balanced modulator which is stable in operation even in the event of carrier level variation and which is capable of realizing nearly ideal double-balanced modulation even when the carrier is a sine wave.

The invention provides an improved and novel double-balanced modulator in which a constant current driver circuit is connected to the input sides of the two balanced amplifiers, and the current supplied from the constant current circuit (which may also be referred to as a constant current source) is arranged to flow in alternating fashion in the two balanced amplifiers in accordance with the polarity of the carrier at any given instant. More specifically, the operating current is switched in response to carrier polarity. Thus, the transistors which comprise each balanced amplifier are operated by certain definite operating current determined by the constant current drive circuit. As a result, the modulator of the present invention is operated independently of carrier level variation and is less influenced by differences in the characteristics of the transistors used as compared with conventional double-balanced modulators.

It is, therefore, a primary object of the present invention to provide a modulating scheme of the double-balanced modulator type wherein the pair of alternately operating balanced amplifiers are driven by a constant current source to significantly reduce harmonics and hence distortion in the modulated carrier output signal.

This, as well as other objects of the present invention will become apparent when reading the accompanying description and drawings in which.

Figure 1:
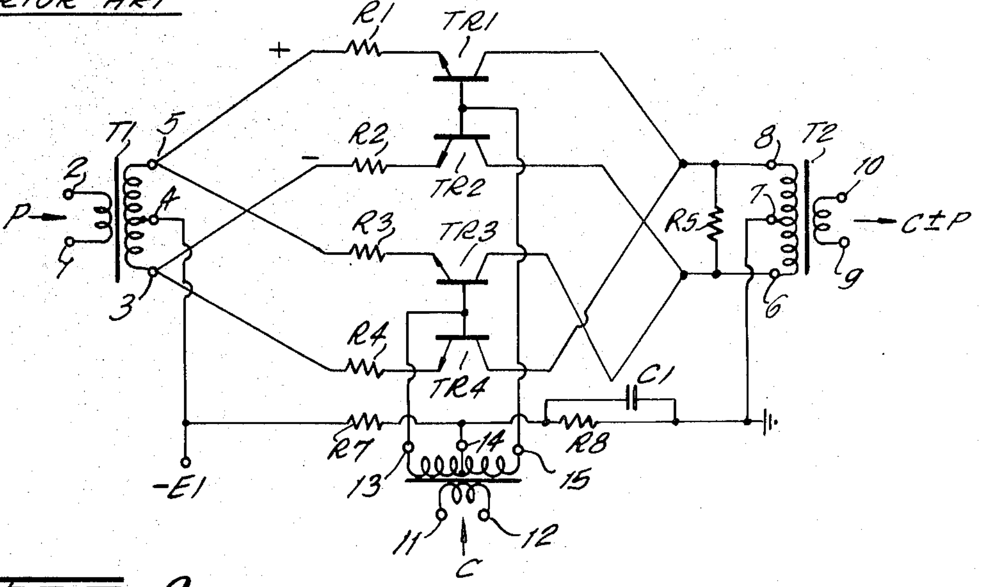
FIG. 1 PRIOR ART
FIG. 1 is a circuit diagram of a conventional double-balanced modulator employing active elements.

The prior art embodiment of FIG. 1 shows a double-balanced modulator which is comprised of transistors $TR_1$ and $TR_2$ which form a first balanced amplifier for an input signal P applied to the primary winding of transformer $T_1$ and coupled to the emitters of transistors $TR_1$ and $TR_2$ through the output terminals 3 and 5 of the transformer secondary winding, which is preferably a symmetrical winding and has a center tap 4.

The collectors of transistors $TR_1$ and $TR_4$ are connected in common to one terminal 8 of the primary winding of output transformer $T_2$, which primary winding is preferably a symmetrical winding having a center tap 7. The collectors of transformers $TR_2$ and $TR_3$ are connected in common to the remaining terminal 6 of the output transformer primary winding. The modulated carrier signal is developed across terminals 9 and 10 of the output transformer secondary winding.

The carrier signal C is coupled across the input terminals 11 and 12 of the transformer $T_3$ primary winding, whose secondary winding is of the symmetrical type. The secondary winding output terminals 13 and 15 are coupled in common to the base electrodes of transistors $TR_3$–$TR_4$ and $TR_1$–$TR_2$, respectively.

Transistors $TR_1$ and $TR_2$ operate as a balanced amplifier for the input signal P applied across the input terminals 1 and 2 of the primary winding for transformer $T_1$. The input signal is modulated by the balanced amplifier during one half-wave period of the carrier C. transistors $TR_3$ and $TR_4$ likewise operate as a balanced amplifier through the input signal P to modulate the carrier during the other half-wave period. The two balanced amplifiers are connected in parallel with each other so that the polarity of the output during one half-wave period of the carrier C is opposite to the output developed during the other half-wave period of the carrier.

The value of the operating current at each of the individual balanced amplifiers depends essentially upon the ratio between the voltage of the carrier C and the linearizing resistors $R_1$ through $R_4$ which are connected in series fashion to the emitters of the respective transistors $TR_1$ through $TR_4$. Accordingly, the operating point of each amplifier is caused to be varied as a result of carrier level variation which, in turn, causes variations in the input impedance, conversion gain and amount of attenuation of distortion. This is the reason why the grounded-base input impedance $h_{ib}$ of the transistors vary in proportion to nearly the reciprocal of the emitter current. Thus, the operating current of the balanced amplifiers varies even when the carrier has a sine wave waveform and has a constant DC level. As a result of the nonlinearity of the $h_{ib}$ characteristic, the input signal P is subjected to distortion and some unnecessary distortion components such as C±2P and C±3P are developed and appear as part of the output signal.

In order to reduce the amount of the distortion components, it is necessary to increase the resistance values of linearizing resistors $R_1$–$R_4$. An increase in these values however, causes a decrease in the conversion gain. Since the impedance in the output side of the amplifiers cannot be arbitrarily increased for circuits of this type which provide wideband operation in the high-frequency region, there is a practical limitation on the amount of adjustment provided in the linearizing resistors in order to be assured that suitable conversion gain is provided. These limitations lead to a further limitation in the amount of suppression which may be obtained for the distorted components, and the output signal tends to be affective by differences in the characteristics of the transistors employed in the circuit. Resistor $R_5$ serves to establish impedance matching for the output circuit.

Figure 2:
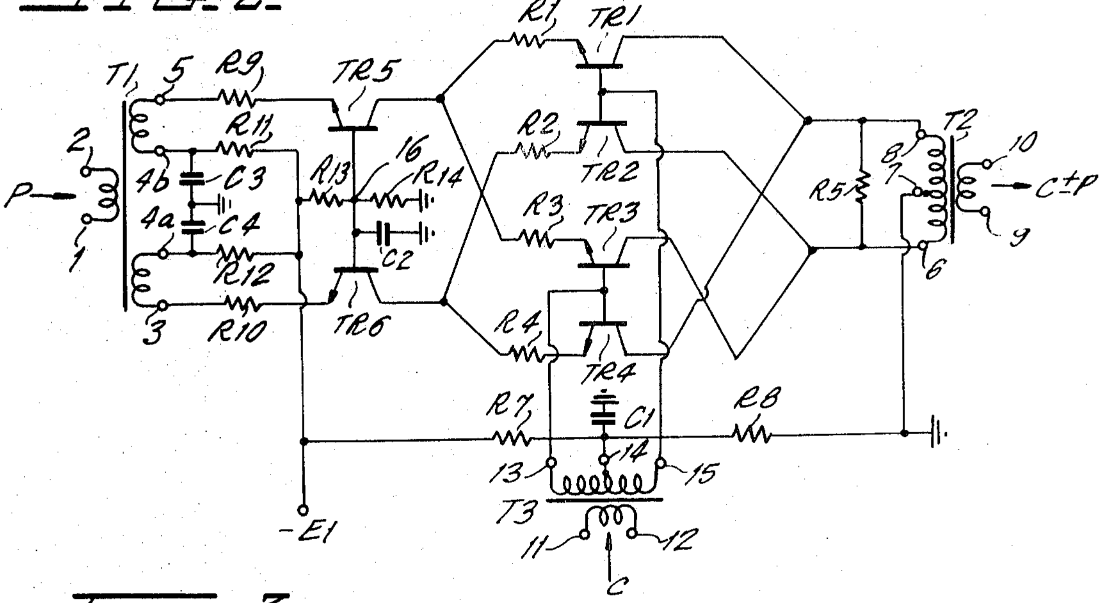
FIG. 2 is a circuit diagram of a current-switching-type double-balanced modulator designed in accordance with the principles of the present invention.

Making reference to FIG. 2, in which like components are designated with like numerals with regard to FIG. 1, the double-balanced modulator circuit of FIG. 2 is provided with grounded-base transistors $TR_5$ and $TR_6$ which operate as a constant current driver circuit. The emitters of transistors $TR_1$ and $TR_3$ are connected in common to the collector electrode of transistor $TR_5$ by way of series-connected balancing resistors $R_1$ and $R_3$, respectively. In a similar fashion, the emitter electrodes of transistors $TR_2$ and $TR_4$ are connected in common to the collector electrode of transistor $TR_6$ by way of balancing resistors $R_2$ and $R_4$, respectively. The base electrodes of transistors $TR_1$–$TR_2$ and $TR_3$–$TR_4$ are respectively connected to the terminals 15 and 13 of the symmetrical secondary winding of carrier supply transformer $T_3$. The base electrodes of transistors $TR_5$ and $TR_6$ are connected in common to terminal 16. A bias voltage for determining the operating current is applied to these base electrodes. The base voltage is provided in such a manner that the DC source voltage ($-E_1$) is divided by a resistance divider circuit comprised of $R_{13}$ and $R_{14}$ which are connected between the DC supply and ground. This DC voltage is bypassed to ground by capacitor $C_2$. The emitters of transistors $TR_5$ and $TR_6$ are connected by way of linearizing resistors $R_9$ and $R_{10}$ respectively, to terminals 5 and 3 of the input transformer secondary winding which is also preferably a symmetrical winding as is the case with the circuit of FIG. 1. A terminal $4_a$ of the two terminals ($4_a$ and $4_b$) corresponding to the central point of the secondary winding of input transformer $T_1$ is connected to the power source ($-E_1$) by way of resistor $R_{12}$, and the other center terminal $4_b$ is likewise connected to power source ($-E_1$) by way of resistor $R_{11}$. Terminals $4_a$ and $4_b$ are bypassed by capacitors $C_4$ and $C_3$, respectively. The center tap 7 of the output transformer $T_2$ primary winding is grounded. A bias voltage is applied to the center tap 14 of the carrier supply transformer $T_3$. This bias voltage is provided in such a manner that the source voltage ($-E_1$) is divided by resistors $R_7$ and $R_8$ and then bypassed to ground by capacitor $C_1$.

An input signal P which is to be modulated is applied to the input winding of input transformer $T_1$ while a carrier signal C is supplied to the primary winding of carrier supply transformer $T_3$.

Transistors $TR_1$ and $TR_2$ operate as a balanced amplifier for input signal P during one half-wave period of the carrier. Similarly, transistors $TR_3$ and $TR_4$ operate as a balanced amplifier during the other half-wave period. In the circuit scheme employed, the operating current of each of the balanced amplifiers (when operating) is arranged to be equal to the collector current of its associated transistor $TR_5$ or $TR_6$. The value of the collector currents of these transistors is determined by the bias circuitry. Also, the level of the carrier signal C is selected as to be large enough so as to effect current switching whereby operating current will flow into only one of the two balanced amplifiers. The carrier level does not directly affect the operating current of the balanced amplifiers because the two balanced amplifiers are connected in parallel with each other so, that their output polarities oppose one another. The polarity in the amplified signal P of the secondary winding of output transformer $T_2$ ideally is repetitively inverted in synchronism with the frequency of the carrier. Thus, the desired modulation product component C±P is the output developed across the secondary winding of transformer $T_2$. This output contains a smaller amount of the unnecessary and undesirable distorted components such as C±2P and C±3P than would be obtained through the use of the conventional circuitry, such as, for example that shown in FIG. 1.

In the double-balanced modulator circuit of FIG. 1, transistors $TR_1$ through $TR_4$ must have strictly uniform characteristics, especially with regard to their degree of grounded emitter current amplification, in order to establish the necessary balance in the operating current. In accordance with the present invention, the operating current balance is obtained merely by providing uniform grounded-base current amplification as between the balanced amplifiers. This greatly relieves the amount of care which has previously been required to maintain uniform characteristics of the transformers employed in the circuitry. In accordance with prior art techniques, resistors $R_1$ through $R_4$ which are provided for linearizing the input impedances of transistors $TR_1$ through $TR_4$ effect the input impedance and the distortion, conversion gain and operating current balance as well. Hence, in order to obtain adequate resistance values, complicated adjustment of the resistors is necessary. However, in accordance with the present invention, the resistors $R_1$ through $R_4$ serve only to compensate for the carrier leakage or, namely, the uneven switching characteristics of the transistors and the influence that these resistors exert upon the input impedance, distortion, conversion gain and operating current is, at most, insignificant, thereby greatly simplifying the selection and adjustment of the proper resistance values.

Figure 3:
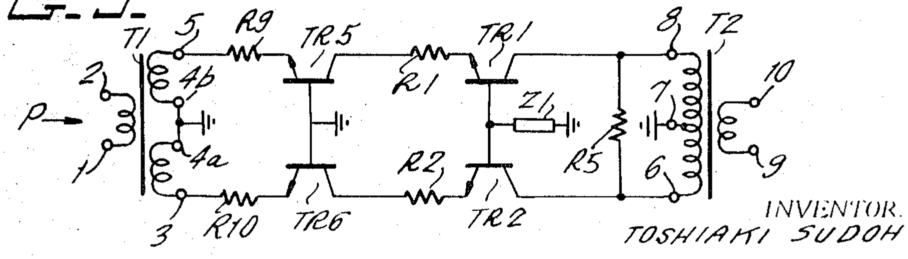
FIG. 3 is an equivalent circuit diagram for the scheme of FIG. 2 showing the operation of the modulator during a half-wave period of the carrier signal.

FIG. 3 shows a circuit diagram illustrating the effect of the embodiment of the invention upon FIG. 2. More specifically, FIG. 3 shows an equivalent circuit derived from FIG. 2 when the polarity of the carrier signal C at the terminal 15 on the secondary side of transformer $T_3$ is positive. The impedance $Z_1$ inserted between the base electrodes of transistors $TR_1$ and $TR_2$ and ground potential indicates the equivalent impedance of the carrier supply source. The collector electrodes of the constant current driver transistors $Tr_5$ and $TR_6$ are connected in series to the emitter electrodes of polarity switching transistors $TR_1$ and $TR_2$ by way of balancing resistors $R_1$ and $R_2$, respectively. As is generally known, the output impedance of a grounded-base transistor is larger than its input impedance $h_{ib}$. Hence, a small variation in the input impedances of transistors $TR_1$ and $TR_2$ does not affect the current of signal P flowing into transistors $TR_1$ and $TR_2$ from transistors $TR_5$ and $TR_6$, respectively.

The resistance values of $R_1$ and $R_2$ are usually small in comparison with the output impedances of transformers $TR_5$ and $TR_6$. Therefore, the input impedances of transistors $Tr_1$ and $Tr_2$ will have almost no influence upon the current of signal P flowing into transistors $TR_1$ and $TR_2$. In other words, the signal P which is obtained as an output is not affected by the circuit polarity inversion unless a variation occurs in the amplification degree of the grounded-base current of transistors $TR_1$ and $TR_2$ which operate for circuit polarity inversion.

If the grounded-emitter current amplification degree of a transistor is sufficiently large, the grounded-base current amplification degree of the transistor is nearly equal to unity and its deviation is quite small. Accordingly, the differences in the switching characteristics of transistors $TR_1$ and $TR_4$ need only be compensated for by adjusting the values of resistors $R_1$ through $R_4$, thereby making it possible to realize ideal circuit polarity inversion while distortion in the output is significantly minimized.

In the embodiment of FIG. 2, when the characteristics of transistors $TR_5$ and $Tr_6$ are uniform or when the differences in the characteristics of these transistors can be completely compensated for by resistors $R_9$ and $R_{10}$, the central terminals 4*a* and 4*b* of input transformer $T_1$ can be directly connected to each other such that transistors $TR_5$ and $TR_6$ operate as a differential amplifier in the DC sense.

Figures 4, 5, 6:
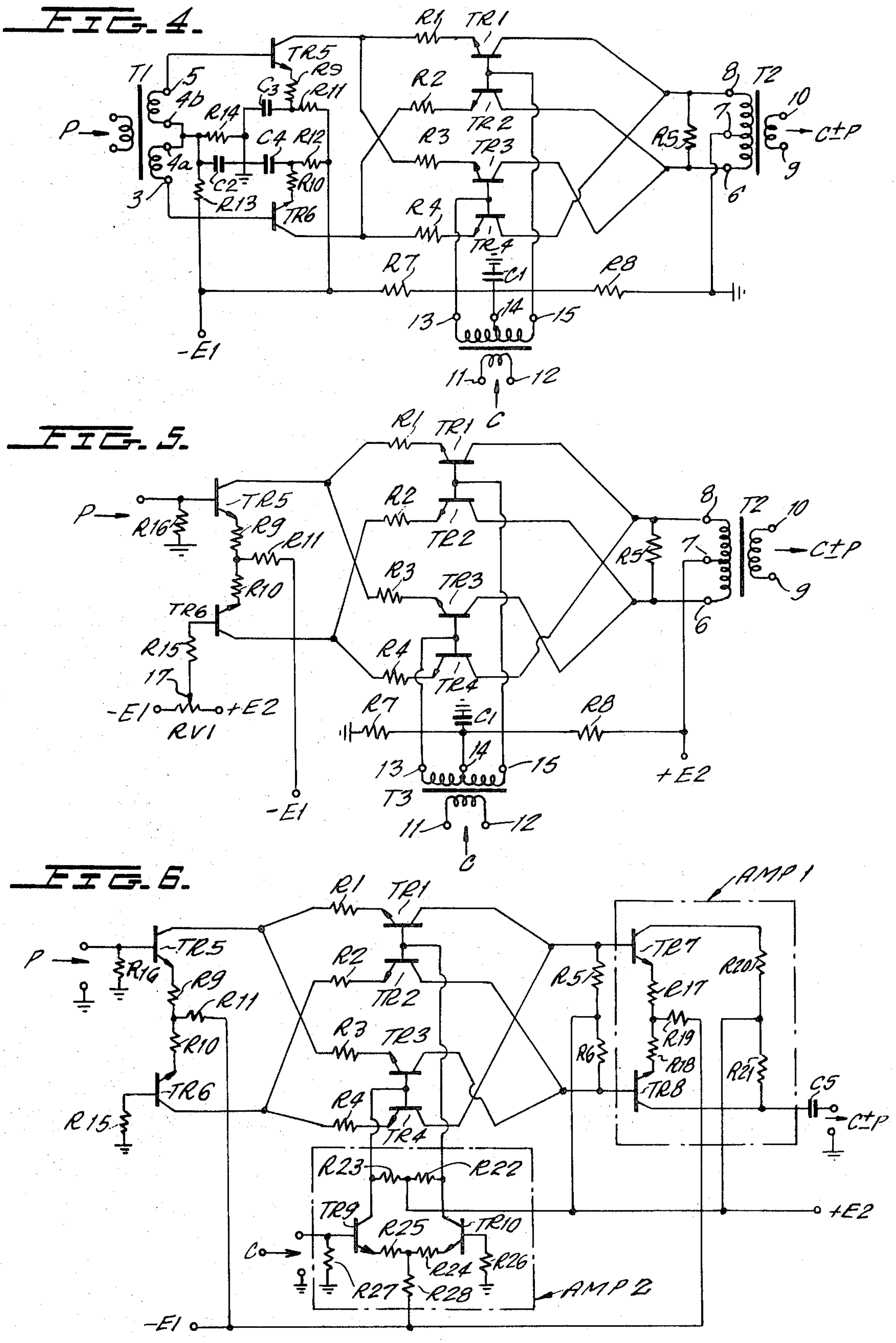
FIG. 4 is a circuit diagram showing a modification of the modulator of FIG. 2.
FIG. 5 is a circuit diagram of another embodiment of the invention for use in applications wherein the input signal contains a DC component.
FIG. 6 is a circuit diagram showing still another embodiment of the invention in which the transformers of the embodiments of FIGS. 2 through 5 may be omitted.

FIG. 4 shows a double-balanced modulator circuit which embodies the principles of the present invention wherein the grounded-emitter configuration is employed in place of the grounded-base configuration of the constant current driver circuit comprised of resistors $TR_5$ and $TR_6$ as shown in FIG. 2. The modified circuitry of FIG. 4 is well suited for operations in which the frequency of the signal P to be modulated is relatively low and in which high-conversion gain is required. Resistors $R_9$ through $R_{12}$ serve to adjust the current for the constant current driver circuit, while capacitors $C_3$ and $C_4$ provide the bypass to ground. The remainder of the circuit is substantially similar to that shown in FIG. 2.

FIG. 5 shows still another embodiment of the invention which is well suited for operation and applications wherein a DC component is included in the input signal P, such as is the case with television signals. The constant current driver transistors $TR_5$ and $TR_6$ are connected so as to form a differential amplifier. Input signal P is applied directly to the base electrode of transistor $TR_5$, while a bias voltage for determining the modulation degree is applied to the base of transistor $TR_6$. Modulation is accomplished through current switching by the transistors $TR_1$ through $TR_4$ in the same manner as that previously described with regard to the embodiment of FIG. 2.

Since transistors $TR_5$ and $Tr_6$ form a differential amplifier, these transistors serve to maintain the modulation degree, the excess carrier ratio, in a stable fashion in spite of the presence of ambient temperature variations and power source fluctuations. The modulation degree can be very easily determined in the embodiment of FIG. 5 merely by adjustment of the variable resistor RV1 whose end terminals are connected between bias levels ($-E_1$) and ($+E_2$). The adjustable arm 17 of the variable resistor is coupled to the base electrode of transistor $TR_6$ through resistor $R_{15}$. Modulation of carrier signal C by the input signal P occurs in substantially the same fashion as that which was previously described with regard to FIG. 2.

FIG. 6 shows still another embodiment of the present invention wherein a differential amplifier AMP1 is substituted for the output transformer $T_2$ of FIG. 5, and a second differential amplifier $AMP_2$ is substituted for the carrier supply transformer $T_3$ of FIG. 5. The distinct advantage of the circuit arrangement shown in FIG. 6 is such that the double-balanced modulator circuit is provided with input, output and carrier supplies which are arranged in an unbalanced condition (i.e. one side grounded) and that transformers have been completely eliminated. This enables the circuit to be of the monolithic integrated circuit (IC) type which is comprised of a combination of several differential amplifiers. Accordingly, more stable characteristics can be obtained with respect to external variations such as ambient temperature than that which can be obtained through the use of a circuit comprised of discrete transistor and resistor elements. In addition, the absence of transformers in the circuitry yields a highly efficient double-balanced modulator which has an extremely wide operating band extending from DC to a frequency which is almost as high as the cutoff frequency of the transistors employed in the circuit.

From the foregoing description it can be seen that the present invention provides a current switching type double balanced modulator which exhibits nearly ideal circuit polarity inversion, has a desirable and stable distortion characteristic, has stable conversion gain and has a stable input impedance characteristic which is substantially unaffected by carrier level variation. Whereas the foregoing embodiments of the invention describe circuits employing transistors of the NPN type as the active elements, it should be understood that PNP transistors, or field effect transistors or any other active elements having similar characteristics may be employed in place of the NPN-type transistors which are employed in the embodiments of FIGS. 2 through 6 without departing from the basic concept and spirit of the invention.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. In a double-balanced modulator having first and second balanced amplifiers each having first and second input terminals and first and second output terminals and a control terminal;

said balanced amplifiers being connected in parallel whereby the first input terminals, the second input terminals, the first output terminals and the second output terminals of said first and second balanced amplifiers are respectively connnected in common, whereby the polarities of their outputs are mutually reversed;

means for coupling a carrier signal across the control terminals of said first and second balanced amplifiers to operate the balanced amplifiers in a one at a time alternating fashion;

input means for simultaneously coupling a signal to be modulated to the first and second input terminals of both of said balanced amplifiers;

output means connected to the first and second outputs of both of said balanced amplifiers for alternately extracting the modulated signal for the balanced amplifiers the improvement comprising constant current driving means connected between said input means and the first and second input terminals of both of said balanced amplifiers for maintaining uniform current in said balanced amplifiers.

2. The modulator of claim 1 wherein said constant current driving means is comprised of first and second constant driving circuits for respectively supplying uniform current to the first and second inputs of both of said balanced amplifiers.

3. A modulator as claimed in claim 1, wherein at least one of said constant current driving circuits deliver, in response to said signal to be modulated, balanced outputs which are substantially equal in magnitude and are of opposite polarity.

4. A modulator as claimed in claim 1, in which at least one of said constant current driving circuits is a differential amplifier.

5. A modulator as claimed in claim 4 in which said carrier signal input means is a differential amplifier.

6. A modulator as claimed in claim 4 in which said output means is a differential amplifier.

7. A modulator as claimed in claim 2 wherein said input means is comprised of a transformer having an input winding for receiving the input signal and a symmetrical output winding coupled to the inputs of said first and second constant current driving circuits.

8. A modulator as claimed in claim 2 wherein said means for coupling said carrier signal is comprised of a transformer having an input winding for receiving the carrier signal and a symmetrical output winding coupled to the control terminals of said first and second balanced amplifiers.

9. A modulator as claimed in claim 2 wherein said output means is comprised of a transformer having a symmetrical input winding for alternately receiving the modulated output from the first and second output terminals of said first and second balanced amplifiers; and an output winding for developing the final modulated signal.

10. The modulator of claim 1 wherein each balanced amplifier is comprised of first and second transistors having base, emitter and collector electrodes; the first and second input terminals of each balanced amplifier being respectively connected to the emitter electrodes of said first and second transistors, the control terminal of each balanced amplifier being connected in common to the base electrodes of said first and second transistors; and the first and second output terminals of each balanced amplifier being respectively connected to the collector electrodes of said first and second transistors.